Dec. 19, 1961 R. A. PALMORE 3,013,630
AIR FILTERING APPARATUS
Filed Nov. 27, 1957 2 Sheets-Sheet 2
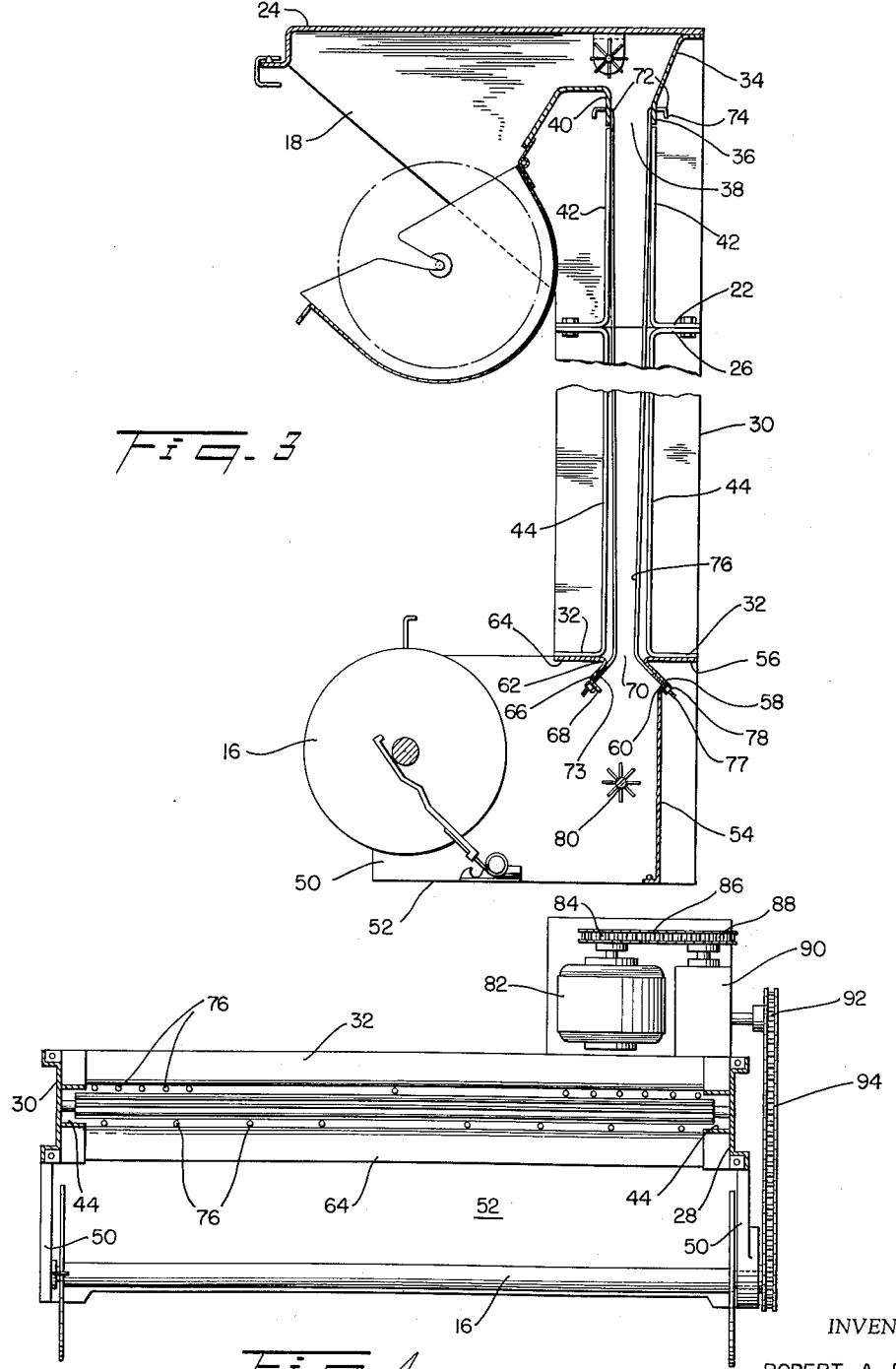
INVENTOR.
ROBERT A. PALMORE
BY
W. D. Keith
ATTORNEY

United States Patent Office 3,013,630
Patented Dec. 19, 1961

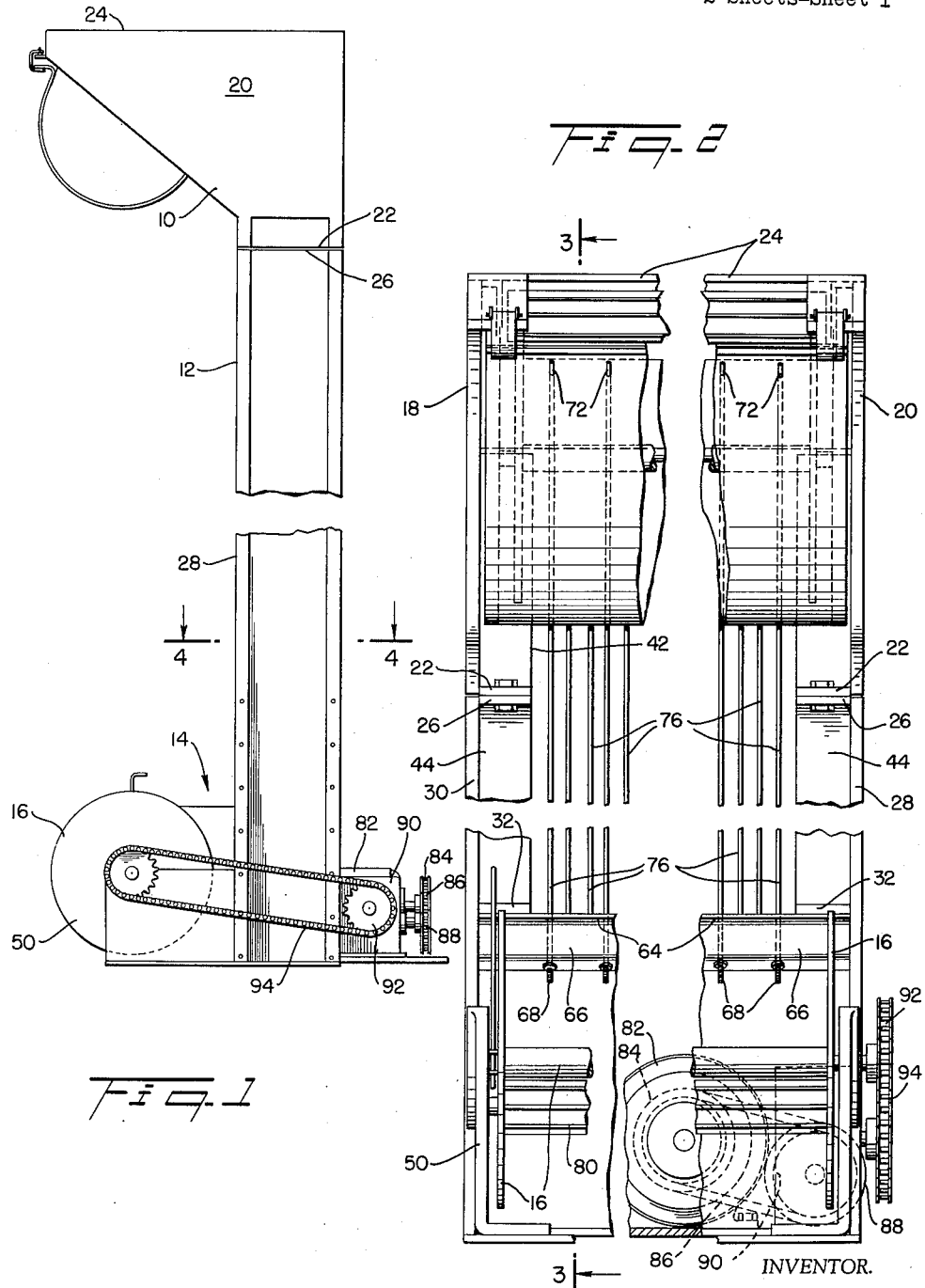

3,013,630
AIR FILTERING APPARATUS
Robert A. Palmore, Louisville, Ky., assignor to American Air Filter Company, Inc., Louisville, Ky., a corporation of Delaware
Filed Nov. 27, 1957, Ser. No. 699,375
8 Claims. (Cl. 183—62)

This invention relates to automatic air filters of the disposable medium type and more particularly to automatic air filters of the type wherein a web of expansible-compressible permeable material is maintained in convolutely wound compressed condition in a supply zone, passed through an air filtering zone in substantially fully expanded condition and then recompressed in a discharge zone so as to form a compact readily disposable package hereof.

The general type of air filter herein of particular concern is broadly disclosed in the Rivers U.S. Patent 2,807,330 granted September 24, 1957. Air filter apparatus of this general type contemplates the use of a web of expansible-compressible permeable material of such character as to resiliently expand to its operating air flow depth upon release of a force maintaining the same in a compressed state. A preferred web of this general character is the expanded filamentous or fiber glass mat or web disclosed in the Jackson U.S. Patent 2,798,531.

Due to the rather flaccid or limp character of the web in its expanded state, displacement of the filter medium through the air filtering zone in apparatus of the general type herein of particular concern has heretofore required the provision of relatively complicated and expensive means to effect the desired advance thereof and to concommitantly provide sufficient support for the suspended portions of the expanded web to prevent undesired sagging and/or compacting thereof that would normally be occasioned by its own weight.

This invention may be briefly described as an improved construction for air filtering zone portions of automatic air filter apparatus of the general type described which include novel means for supporting the expanded filter medium while the same is disposed within and being advanced across the air filtering zone and a simplified drive for effecting the advance of the medium from a supply zone through said air filtering zone and into a discharge zone that is permitted by utilization of said support means.

The object of this invention is the provision of an improved construction for automatic air filter apparatus of the disposable medium type.

Another object of this invention is the provision for improved means for supporting the expanded filter medium during its passage through the air filtering zone.

A further object of this invention is the provision of an improved and simplified drive system for automatic air filter apparatus of the disposable medium type.

Another object of the invention is the provision of an improved construction for air filter apparatus that permits factory fabrication of the unit in the form of a plurality of component elements that are readily and simply assembled and erected at the installation site.

Other objects and advantages of the invention will be disclosed in the following specification and claims and in the accompanying drawings which illustrate, by way of example, the principles of the invention and the presently preferred embodiments incorporating those principles.

Referring to the drawings:

FIG. 1 is a side elevational view of an automatic air filter of the disposable medium type.

FIG. 2 is a front elevational view of the apparatus embodied in FIG. 1;

FIG. 3 is a sectional view taken on the line 3—3 of FIG. 2; and

FIG. 4 is a sectional view taken on the line 4—4 of FIG. 1.

FIGURES 1 and 2 illustrate the essentials of an automatic air filter of the disposable medium type as broadly disclosed in the aforementioned Rivers patent. Such apparatus broadly includes a supply zone portion, generally designated 10, in which a convolutely wound supply web of compressed filter medium is maintained in compressed condition; an air filtering zone portion, generally designated 12, through which the web of filter medium after removal from its compressed state in the supply zone, is incrementally advanced in a substantially fully expanded condition; and a discharge zone portion, generally designated 14, into which the used medium is introduced and convolutely wound in compressed condition upon a suitable rewinding spool 16 to form a compact readily disposable package thereof. The hereinafter described and illustrated structure is so arranged as to permit factory fabrication of the above mentioned portions as discrete units that are simply and readily assembled and erected at the point of ultimate use.

The presently preferred construction for the supply zone portion 10 is illustrated and described in detail in my co-pending application, Ser. No. 699,374 filed November 27, 1957. Insofar as herein of interest, the supply zone portion 10 includes a canopy-like arrangement formed of a pair of vertically disposed, generally triangularly shaped side wall portions 18 and 20 each dependently terminating in inwardly directed flange portions 22 and having a horizontally disposed top wall or cover 24 disposed across the upper edges thereof. The inwardly directed flange portions 22 readily permit site assembly of the unit by bolted securement of the supply zone assembly to companion inwardly directed flange portions 26 on the upper ends of the side wall frame members 28 and 30 that define, in part, the extent of the air filtering zone 12. The side wall frame members 28 and 30 are preferably formed of a pair of vertically disposed outwardly open channel members having the aforementioned inwardly directed flanges 26 at the upper end thereof and having another set of inwardly directed flanges 32 at the lower end thereof.

The flanges 32 readily permit site assembly of the air filtering zone and discharge zone portions by bolted securement thereof to companion flange members included in said discharge zone portion.

Dependent from the rear edge of the top wall 24 and secured at its ends to the abutting surfaces of the side wall portions 18, 20 is an inwardly directed sloping rear wall portion 34 (see FIG. 3). Dependent from the lower edge thereof is a veritcally disposed flange-like member 36 defining one side of a preferably rectangular entry aperture 38 to the air filtering zone. Disposed parallel to and in uniform spaced relation with the member 36 is a vertically disposed cross plate 40 preferably supported by securement of the ends thereof to the side wall portions 18 and 20. The members 36 and 40 cooperatively define the entry aperture 38 for the filter medium to the air filtering zone. The transverse spacing intermediate the members 36 and 40 will be determined by the operating air flow depth or thickness of the particular filter medium that will be employed in a particular filter apparatus and preferably should be such as to effect a slight compression of the filter medium as it is advanced therethrough.

Each of the side wall portions 18, 20 also carries an inwardly open channel 42 which extends downwardly from the dependent edge of the aperture 38 to provide a side guide and seal for the side edge portions of the expanded filter medium and thereby prevent undesired flow of air therearound. The width of the channel 42 should preferably be such as to effect a marked compression of the edge portion of the expanded filter medium adapted to be contained therein. Similar inwardly directed channels 44 are carried by the side wall frame members 28 and 30 and such are disposed in alignment with the channels 42 to provide, in an assembled unit, a continuous side guide and edge seal assembly throughout the extent of the air filtering zone.

The inwardly directed flange members 32 disposed on the lower end of the side wall frame members 28 and 30 serve to permit bolted connection of said side wall members to companion flange members on the structure forming the discharge zone 14. The discharge zone 14 generally includes a pair of vertically disposed side walls 50 which extend forwardly of the unit to provide the necessary space to permit mounting of the rewind spool 16 therewithin. Disposed across the bottom edges of the side wall portions 28 and 30 is a floor plate 52, and connected across the rear edges thereof is a rear wall section 54.

The rear wall section 54 includes a horizontally disposed rearwardly directed flange 56 at its upper edge and an outwardly sloping downwardly directed portion 58 immediately therebelow. Disposed intermediate the dependent end of the sloping portion 58 and the vertically disposed portion 54 of the rear wall is a transversely disposed connecting portion 60 which serves, as will be described later, as a shelf-like mounting member. Disposed in alignment and in spaced relation with the flange 56 is a cross member, generally designated 62, supported at its ends by securement to the side wall portions 50 of said discharge zone structural assembly. The cross member 62 preferably includes a horizontally disposed portion 64 sized to underlie the flange portion 32 and to permit bolted securement therebetween, an outwardly sloping downwardly directed portion 66 and an extending flange portion 68 perpendicularly disposed on the dependent edge thereof.

As best illustrated in FIGURE 3 the horizontally disposed flange portions 56 and 64 cooperatively define a web exiting aperture 70 from the air filtering zone and the transverse spacing therebetween is preferably appreciably less than that intermediate the members 36 and 40 that cooperatively define the entry aperture 38. The members 36 and 40 are each provided with a series of spaced apertures 72 therein. The connecting portion 60 of the rear wall section 54 and the extending flange portion 68 of the cross member 62 are also provided with a series of similar apertures 73 disposed in vertical alignment with said apertures 72 in the members 36 and 40 respectively. Each of the apertures 72 in the members 36 and 40 serves to provide a mount for the hooked upper end 74 of a longitudinally disposed web supporting rod or wire 76. The lower ends of the rods or wires 76 are preferably predeformed slightly at the point corresponding to the location of the exit aperture 70 so that the threaded end portions 77 disposed therebelow diverge in approximately parallel relationship with the sloping portions 58 and 66 of the rear wall and cross members 54 and 62 respectively. The rods 76 are sized so that the threaded lower ends 77 thereof extend through the apertures 72 so as to permit suitable nuts 78 to be turned thereon to firmly secure the rod members in place.

Installation of each of the rods 76 is readily effected after site assembly of the supply, air filtering and discharge zone subassemblies, as described above, by initially inserting the threaded end thereof into one of the apertures 73 in the members 60 and 68 and then downwardly displacing the rods until the hooked upper end 74 engages the corresponding aligned aperture 72 in the members 36 and 40 that cooperatively define the web entry aperture 38 to the air filtering zone. A nut 78 is then screwed on the extending threaded end 77 a distance sufficient to place the rod under tension, which, in addition to assuring the desired vertical alignment of the rod 76 aids in bracing and stiffening the assembled unit.

As illustrated, the rods 76 are disposed so that the length thereof is parallel to the path of advance of the filter medium and provide a relatively open supporting structure for the front and rear faces of the portion of the expanded web that is disposed in the air filtering zone. Since the direction of air flow through the air filtering zone is normally from front to rear the number of so-called rear rods should preferably exceed the number of so-called front rods. However, it is always advisable to provide a sufficient number of front rods to support the front face of the web against a back draft through the filter apparatus when the unit is shut down. FIGURE 4 illustrates one suitable arrangement of rod spacing that may be employed.

As described above, the spacing of the members 36 and 40 that cooperatively define the web entry aperture 38 to the air filtering zone, the spacing of the members 56 and 64 that cooperatively define the web exit aperture 70 from the air filtering zone and the tensioning of the rods 76 result in a gradual convergence of the rod members 76 across the extent of the air filtering zone 12 in the direction of travel of the advancing web of filter medium. Such convergence, although very gradual in nature and slight in extent, I have found to provide sufficient support for the column of expanded filter medium disposed in the air filtering zone to effectively prevent detrimental sagging or compacting thereof that would be otherwise occasioned by its own weight. While the spacing intermediate the rods 76 at the exit aperture 70 and the degree of convergence of the rods may vary within limits and still be effective to achieve the desired results, I have found that detrimental sagging and compacting is effectively prevented if the transverse spacing at the exit aperture 70 generally is about ⅔ that of the entry aperture 38. The desired degree of convergence in any given installation will be dependent upon the length of the column of expanded filter medium the particular character of the medium employed, and the number of rod members 76 that are used.

The above described novel web supporting means in addition to its advantages of simplicity and minimal air flow obstruction, permits utilization of a simplified drive system wherein web displacement may be effected entirely by tension on the delivered material. The presently preferred arrangement for effecting such type of drive includes a horizontally disposed fluted roller 80 sized to extend across the width of the filter medium and rotatably mounted at its ends in the side walls 50 of the discharge zone 14. The roller 80 is preferably located below the exit aperture 70 and is disposed so that the periphery thereof is spaced from the rear wall 54, a sufficient distance to effect a marked compression of the web as it passes therebetween and around the surface of said roller to the rewind spool 16.

The drive for effecting rotational displacement of the rewind spool 16 includes a drive motor 82 having a shaft mounted sprocket 84 connected by a drive chain 86 to a sprocket 88 on a gear reducer unit 90. A sprocket 92 on the output shaft of the gear reducer unit 90 is connected by a chain 94 to a suitable sprocket 96 on the shaft, an axle of rewind spool 16. The above-described drive system effects direct rotation of the rewind spool 16 in response to actuation of the drive motor 82.

In operation of the described unit the converging rods 76 provide sufficient support to prevent detrimental sagging or compacting of the column of expanded filter medium disposed in the air filtering zone 12 and yet, because of their character and disposition relative to the direction of web travel provide minimal resistance to web advance thereby permitting utilization of a simplified drive mechanism which serves to advance the web of filter material from its compressed state in the supply zone 10, through the air filtering zone 12 and into the discharge zone entirely by the tension on the delivered material.

Having thus described my invention, I claim:

1. In air filter apparatus arranged to employ, as a filter medium, a web of expansible compressible permeable material that will resiliently expand upon removal of compressive forces thereon and in which the filter medium is advanced from a supply zone through an air filtering zone and into a discharge zone, means defining a filter medium entry aperture to the air filtering zone, means defining a filter medium exit aperture from said air filtering zone and means converging in the direction of filter medium advance and engageable with both of the exposed surfaces of said web extending over the length of said air filtering zone intermediate said entry and exit apertures for supporting a column of filter medium disposed therebetween.

2. In air filter apparatus arranged to employ, as a filter medium, a web of expansible-compressible permeable material that will resiliently expand upon removal of compressive forces thereon and in which filter medium is removed from a compressed state in a supply zone, advanced through an air filtering zone and introduced into a discharge zone, a supporting structure for filter medium disposed in said air filtering zone comprising a plurality of spaced rod members extending over the length of said air filtering zone and disposed in gradually converging relationship in the direction of filter medium advance.

3. The supporting structure as specified in claim 2 in combination with means for displacing filter medium through said air filtering zone entirely by tension on the delivered material.

4. In air filter apparatus arranged to employ, as a filter medium, a web of expansible-compressible permeable material that will resiliently expand upon removal of compressive forces thereon and in which the filter medium is advanced from a compressed state in a supply zone through an air filtering zone and introduced into a discharge zone, a supporting structure for filter medium disposed in said air filtering zone comprising a first coplanar group of rods longitudinally disposed in the direction of web advance and positioned to engage one face of filter medium disposed in said air filtering zone, a second coplanar group of rods longitudinally disposed in the direction of web advance and positioned to engage the other face of said filter medium disposed in said air filtering zone and means for effecting a gradual convergence of said first coplanar group of rods with said second coplanar group of rods in the direction of filter medium advance.

5. The filter medium supporting structure as set forth in claim 4 in combination with means for displacing filter medium from said supply zone to said discharge zone entirely by tension on the delivered material.

6. In an air filter apparatus arranged to employ an elongate web of filter medium of expansible compressible permeable material, a supply zone portion containing means for supporting a convolutely wound supply of unused filter medium and having means defining a filter medium entry aperture, an air filtering zone portion containing means for positioning a length of filter medium in a stream of air to be filtered, a discharge zone portion containing means for supporting a convolutely wound length of used filter medium and means defining a filter medium exit aperture from said air filtering zone, and means permitting site assembly of said supply, air filtering and discharge zone portions by removable securement of said discharge zone to one end of said air filtering zone and by removable securement of said supply zone portion to the other end of said air filtering zone portion and said means for positioning a length of filter medium extending from said filter medium entry aperture through the air filter zone and the filter medium exit aperture to the discharge zone and forming a converging path in the direction of the filter medium advance from said supply zone to said discharge zone.

7. The apparatus of claim 6, wherein the means forming the converging path comprises rod members removably secured in the supply zone, extending through the air filtering zone and removably secured in the discharge zone.

8. The construction as set forth in claim 1 wherein said last mentioned means includes a plurality of longitudinally positioned spaced rod members disposed in gradually converging relationship in the direction of filter medium advance.

References Cited in the file of this patent

UNITED STATES PATENTS

| | | |
|---|---|---|
| 1,982,639 | Christofferson | Dec. 4, 1934 |
| 2,016,991 | Dollinger | Oct. 8, 1935 |
| 2,075,671 | Springer | Mar. 30, 1937 |
| 2,182,831 | Wagner | Dec. 12, 1939 |
| 2,487,763 | Patterson et al. | Nov. 8, 1949 |
| 2,752,003 | Hersey et al. | June 26, 1956 |
| 2,807,330 | Rivers | Sept. 24, 1957 |